US011774605B2

(12) United States Patent
Saito et al.

(10) Patent No.: US 11,774,605 B2
(45) Date of Patent: Oct. 3, 2023

(54) SCINTILLATOR UNIT AND RADIATION DETECTOR (71) Applicant: CANON KABUSHIKI KAISHA, Tokyo (JP)

(72) Inventors: Hiroshi Saito, Kanagawa (JP); Nobuhiro Yasui, Kanagawa (JP); Yoshihiro Ohashi, Tokyo (JP); Yoshinori Kotani, Kanagawa (JP); Satoshi Yamabi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 80 days.

(21) Appl. No.: 17/584,194

(22) Filed: Jan. 25, 2022

(65) Prior Publication Data

US 2022/0179105 A1 Jun. 9, 2022

Related U.S. Application Data

(63) Continuation of application No. PCT/JP2020/029186, filed on Jul. 30, 2020.

(30) Foreign Application Priority Data

Jul. 31, 2019 (JP) .................................. 2019-141822
Jul. 29, 2020 (JP) .................................. 2020-127945

(51) Int. Cl.
*G01T 1/20* (2006.01)
(52) U.S. Cl.
CPC .......... *G01T 1/2002* (2013.01); *G01T 1/2006* (2013.01)

(58) Field of Classification Search
CPC . G01T 1/2002; G01T 1/2006; G01T 1/20183; G01T 1/20; G21K 4/00; A61B 6/00
See application file for complete search history.

(56) References Cited

U.S. PATENT DOCUMENTS 5,208,460 A 5/1993 Rougeot et al.
6,749,761 B1 * 6/2004 Andreaco ............... G01T 1/202
250/362

(Continued)

FOREIGN PATENT DOCUMENTS

FR 2 768 522 A1 3/1999
JP S6325579 A 2/1988
JP 2001516888 A 10/2001

(Continued)

OTHER PUBLICATIONS

Loignon-Houle, F., et al., "Reflectivity quenching of ESR multilayer polymer film reflector in optically bonded scintillator arrays", Nuclear Instruments and Methods in Physics Research A 851, 2017, pp. 62-67.

*Primary Examiner* — Kiho Kim
(74) *Attorney, Agent, or Firm* — Canon U.S.A., Inc., IP Division (57) ABSTRACT

A scintillator unit that can reduce crosstalk when the scintillator unit includes a plurality of scintillators and a radiation detector are provided. More specifically, a scintillator unit includes a reflective layer between a plurality of scintillators and the plurality of scintillators, wherein an adhesive layer and a low-refractive-index layer with a lower refractive index than the adhesive layer are located in this order on the scintillators between the scintillators and the reflective layer.

16 Claims, 5 Drawing Sheets

(56) References Cited

U.S. PATENT DOCUMENTS

2012/0199748 A1\* 8/2012 Cooke .................. G01T 1/2002
                                                                                                    53/461
2016/0155526 A1    6/2016 Arimoto et al.

FOREIGN PATENT DOCUMENTS

| JP | 2005348907 A | | 12/2005 |
|---|---|---|---|
| JP | 2012013694 A | | 1/2012 |
| JP | 2012128402 A | | 7/2012 |
| JP | 2017133894 A | \* | 8/2017 |
| JP | 2017133894 A | | 8/2017 |
| WO | 2010/092869 A1 | | 8/2010 |
| WO | 2016167334 A1 | | 2/2018 |

\* cited by examiner

SCINTILLATOR UNIT AND RADIATION DETECTOR

CROSS-REFERENCE TO RELATED APPLICATIONS

This application is a Continuation of International Patent Application No. PCT/JP2020/029186, filed Jul. 30, 2020, which claims the benefit of Japanese Patent Application No. 2019-141822, filed Jul. 31, 2019 and No. 2020-127945, filed Jul. 29, 2020, which are hereby incorporated by reference herein in their entirety.

TECHNICAL FIELD

The present disclosure relates to a scintillator unit and a radiation detector.

BACKGROUND ART

A radiation detector is used to image an object by radiation in medical settings and the like. In particular, a radiation detector for use in computed tomography (CT) is composed mainly of a scintillator, which generates light by radiation (for example, X-rays), and a detecting unit including two-dimensionally arranged light-receiving devices. When the object is irradiated with X-rays, X-rays passing through the object generate light from the scintillator, and a light-receiving device corresponding to each scintillator detects the light and forms a two-dimensional image of the transmitted X-rays.

However, light generated from the scintillator is emitted in all directions. To guide most of the light generated from the scintillator to the detecting unit, a reflective layer may be provided via an adhesive layer on a surface of the scintillator opposite the detecting unit. For example, Patent Literature 1 describes a flat-panel detector (FPD) including an air layer, a dielectric multilayer reflective film, an adhesive layer, a phosphor layer, and a photodetector in this order in the incident direction of radiation. Patent Literature 2 discloses a structure including an adhesive layer and a refractive coating with a refractive index of less than 1.3 in this order on a scintillator between the scintillator and a silver coating to improve the light collection efficiency of a detector.

The present inventors have investigated the structure of a FPD described in Patent Literature 1 by applying it to a detector for use in CT including a plurality of scintillators and a light-receiving device corresponding to each scintillator. It was found that light generated from a scintillator does not enter the corresponding light-receiving device but enters an adjacent light-receiving device and causes crosstalk.

In Patent Literature 2, the structure including an adhesive layer and a refractive coating in this order on a scintillator between the scintillator and a silver coating was not applied to a detector including a plurality of scintillators and a light-receiving device corresponding to each scintillator.

CITATION LIST

Patent Literature

PTL 1: International Publication WO 2016/167334
PTL 2: PCT Japanese Translation Patent Publication No. 2001-516888

SUMMARY OF INVENTION

Accordingly, it is an aspect of the present disclosure to provide a scintillator unit that can reduce crosstalk when the scintillator unit includes a plurality of scintillators. It is another aspect of the present invention to provide a radiation detector including the scintillator unit.

The present disclosure relates to a scintillator unit including: a reflective layer between a plurality of scintillators and the plurality of scintillators, wherein an adhesive layer and a low-refractive-index layer with a lower refractive index than the adhesive layer are located in this order on the scintillators between the scintillators and the reflective layer.

The present disclosure also relates to a radiation detector including: a scintillator unit including a reflective layer between a plurality of scintillators and the plurality of scintillators; and a detecting unit configured to detect light generated from the scintillators, wherein the scintillator unit includes an adhesive layer and a low-refractive-index layer with a lower refractive index than the adhesive layer in this order on the scintillators between the scintillators and the reflective layer.

Further features of the present disclosure will become apparent from the following description of exemplary embodiments with reference to the attached drawings.

DESCRIPTION OF EMBODIMENTS

A scintillator unit according to the present disclosure includes a reflective layer between a plurality of scintillators and the plurality of scintillators. Furthermore, an adhesive layer and a low-refractive-index layer with a lower refractive index than the adhesive layer are located in this order on the scintillators between the scintillators and the reflective layer. Because the low-refractive-index layer is located between the scintillators and the reflective layer, part of the light generated by one scintillator and directed to an adjacent scintillator is reflected by the interface between the adhesive layer and the low-refractive-index layer and by the reflective layer. This phenomenon is caused by utilizing a physical phenomenon "total reflection" due to a refractive index difference between two media. This can therefore reduce crosstalk caused by light generated from a scintillator and entering a light-receiving device adjacent to the corresponding light-receiving device rather than entering the corresponding light-receiving device.

Embodiments of the present disclosure are described in detail below. Unless otherwise specified, physical properties are determined at 25° C.

Figure 2:
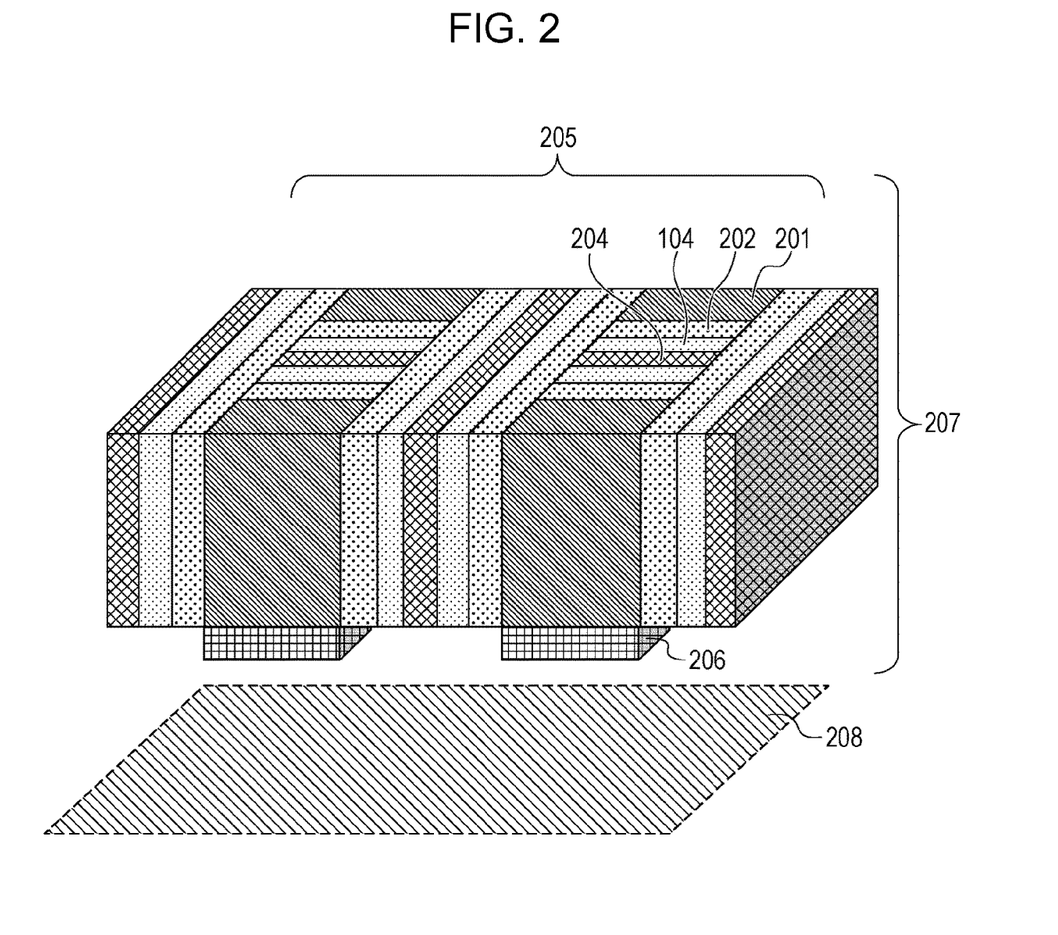
FIG. 2 is a schematic bird's-eye view of an example of a radiation detector according to an embodiment of the present disclosure.

FIG. 2 is a schematic bird's-eye view of an embodiment of a radiation detector according to the present disclosure. In FIG. 2, a scintillator unit 205 includes two-dimensionally arranged scintillators 201 and a reflective layer 204 between two of the scintillators 201. An adhesive layer 202 and a low-refractive-index layer 104 are located between the scintillators 201 and the reflective layer 204 in this order on the scintillators 201, and these are in close contact with each other.

Furthermore, the scintillators may be in contact with the reflective layer, provided that an adhesive layer, a low-refractive-index layer with a lower refractive index than the adhesive layer, and a reflective layer are located in this order on the scintillators between the scintillators.

Another layer may be located between the scintillators and each layer, provided that the advantages of the present disclosure can be achieved.

Examples of layers constituting the scintillator unit include a structure including a scintillator, an adhesive layer, a low-refractive-index layer, and a reflective layer in this order and a structure including a scintillator, an adhesive layer, a low-refractive-index layer, a reflective layer, a low-refractive-index layer, an adhesive layer, and a scintillator in this order.

Examples also include a structure including a scintillator, an adhesive layer, a low-refractive-index layer, a base material, a low-refractive-index layer, an adhesive layer, and a scintillator in this order and a structure including a scintillator, a reflective layer, a low-refractive-index layer, an adhesive layer, a low-refractive-index layer, a reflective layer, and a scintillator in this order. The base material may be a material described later.

The scintillator unit 205 includes the reflective layer 204 between two low-refractive-index layers 104, and the low-refractive-index layer 104 can be located on both sides of the reflective layer 204. Thus, light traveling from one scintillator (for example, the upper part of FIG. 2) to the other scintillator (for example, the lower part of FIG. 2) can be reflected with high probability by the interface between the reflective layer 204 and the low-refractive-index layer 104 (the lower part of FIG. 2, on the other scintillator side). Consequently, even a small number of reflective layers can reduce crosstalk. This enables a plurality of scintillators to be arranged at a high density and improves sensitivity to radiation and the resolution of an image thus formed.

In the structure of a FPD described in Patent Literature 1, an uneven prism sheet and a dielectric multilayer reflective film form an air layer. With such an uneven prism sheet between a plurality of scintillators, the scintillator unit cannot have sufficient strength. Furthermore, the air layer is formed only on one side of the dielectric multilayer reflective film, and a plurality of dielectric multilayer reflective films are required to reduce crosstalk. Thus, it is difficult to arrange a plurality of scintillators at a high density.

Thus, a scintillator unit according to the present embodiment is particularly useful for applications, such as CT, using a radiation detector including a plurality of two-dimensionally arranged scintillators. Furthermore, the low-refractive-index layer 104 is in surface contact with an adjacent member (the reflective layer 204 and the adhesive layer 202 in FIG. 2). Thus, the scintillator unit according to the present embodiment has sufficient strength when used as a device.

[Scintillators 201]

The scintillators 201 in the scintillator unit 205 according to the present embodiment preferably contain a material that emits light by radiation (X-rays, γ radiation, charged particles, or the like).

Examples of materials applicable to the scintillators 201 include halides of alkali metals, alkaline-earth metals, transition metals, typical elements, and rare-earth metals. Additional examples include oxides, nitrides, chalcogenides, and group 13 and 14 compounds. Specific examples include Tl-doped NaI, Tl-doped CsI, Na-doped CsI, Ce-doped $Lu_2SiO_5$ (LSO), Ce-doped $Lu_2Y_2SiO_5$ (LYSO), $Gd_2SiO_5$, $Bi_4Ge_3O_{12}$, $ZnWO_4$, $CdWO_4$, $PbWO_4$, $LuAlO_3$, Ce-doped $Y_3Al_5O_{12}$, Ce-doped $YAlO_3$ (YAP), Ce-doped $GdAlO_3$ (GAP), Ce-doped $LuAlO_3$ (LuAP), Ce-doped $Lu_3Al_5O_{12}$, Pr-doped $Lu_3Al_5O_{12}$, and $CeF_3$. In particular, the scintillators 201 preferably contain at least one of Ce-doped $Lu_2Y_2SiO_5$ and Ce-doped $Lu_2SiO_5$.

[Adhesive Layer 202]

The adhesive layer 202 may be formed of at least one optical adhesive agent of an epoxy resin, an acrylic resin, or a vinyl resin.

For example, the adhesive layer 202 preferably has a refractive index of more than 1.30 and less than 1.70, more preferably more than 1.30 and less than 1.50. When the adhesive layer 202 has a refractive index of less than 1.70, this can decrease the probability that light reflected at the interface between the reflective layer 204 and the low-refractive-index layer 104 is reflected at the interface between the low-refractive-index layer 104 and the adhesive layer 202 and is directed to an adjacent scintillator. Thus, the light can return to the original scintillator 201.

The adhesive layer 202 preferably has a thickness of 5 μm or less, more preferably 1 to 5 μm, still more preferably 2 to 5 μm. The adhesive layer 202 with a thickness of 5 μm or less has smaller variations in thickness and can reduce the fabrication error of the scintillator unit. The adhesive layer 202 with a thickness of 2 μm or more has sufficient adhesive strength.

[Reflective Layer 204]

The reflective layer 204 may be formed of a metal material, such as aluminum or silver, for example. The reflective layer may also be formed of a poly(ethylene terephthalate) (PET) film on which aluminum is vapor-deposited (Alpet (registered trademark)).

A reflective layer formed of a metal material has an optical reflectance in the range of 80% to 100% in the wavelength range of 400 to 700 nm. The optical reflectance is measured in the air.

(Dielectric Multilayer Film)

The reflective layer 204 may be a dielectric multilayer film with a high reflectance. A reflective layer formed of a dielectric multilayer film has an optical reflectance in the range of 95% to 100% in the wavelength range of 400 to 700 nm. The optical reflectance is measured in the air. The dielectric multilayer film only needs to have a high reflectance in the emission wavelength range of a scintillator to be used and does not necessarily have a high reflectance in the wavelength range other than the emission wavelength. The optical reflectance is higher with a dielectric multilayer film than with a metal material, such as aluminum or silver. This can further reduce crosstalk caused by light generated from a scintillator and leaking into an adjacent scintillator.

A dielectric material constituting the dielectric multilayer film may be an inorganic material, an organic material, or a combination thereof. Organic materials are lightweight and flexible and are more preferred. Examples of organic materials include polyester resins, urethane resins, and acrylic resins.

The dielectric multilayer film is preferably in contact with the low-refractive-index layer. This increases the refractive index difference between the dielectric multilayer film and an adjacent layer and improves optical reflectance in the wavelength range of 400 to 700 nm. When the dielectric multilayer film is in contact with the low-refractive-index layer, the low-refractive-index layer preferably has a refractive index in the range of 1.05 to 1.30, more preferably 1.10 to 1.20, particularly preferably 1.15 or less.

(Low-Refractive-Index Layer)
<Composition and Structure>

Figure 1:
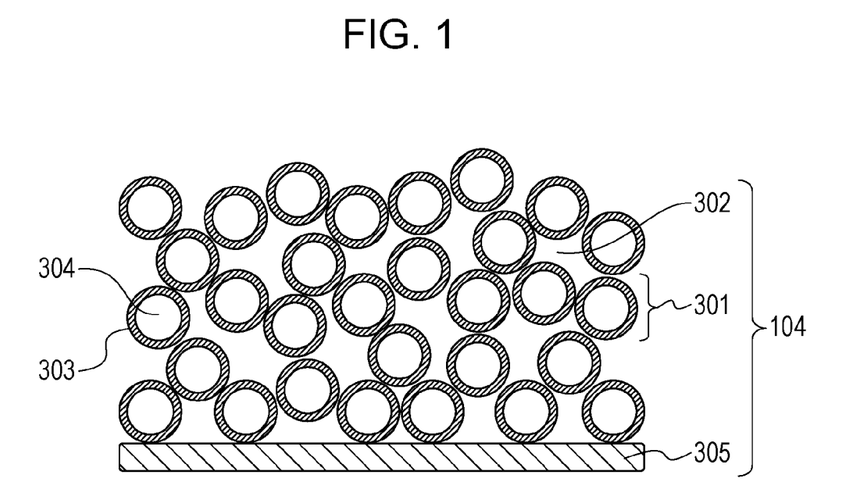
FIG. 1 is a schematic cross-sectional view of an example of a low-refractive-index layer according to an embodiment of the present disclosure.

In FIG. 1, the strength of the low-refractive-index layer 104 can be improved by using a solid material with a refractive index of 1.65 or less as a skeleton to appropriately set the porosity for a lower refractive index.

The solid material may be crystalline or amorphous. The solid material may be particles. The particles may be, but are not limited to, spherical particles, irregular-shaped particles, the spherical or irregular-shaped particles linked in a beaded or branched chain shape, hollow particles with a cavity, or hollow particles linked in a beaded or branched chain shape.

Examples of the solid material include resins, such as fluorinated polymers and acrylic resins, fluorides, such as magnesium fluoride and calcium fluoride, carbonates, such as calcium carbonate and potassium carbonate, sulfates, such as barium sulfate, and oxides, such as silicon dioxide (hereinafter also referred to as silica) and aluminum oxide.

Examples of the solid material with a low refractive index include organic materials such as fluorinated polymers and inorganic materials such as magnesium fluoride and silicon dioxide.

However, even fluorinated polymers with a low refractive index have a refractive index of approximately 1.30, and magnesium fluoride and silicon dioxide (quartz) have a refractive index of 1.38 and 1.46, respectively, and a simple material with a refractive index much lower than 1.30 is mainly a gas such as nitrogen or oxygen.

The solid material preferably contains silicon dioxide in terms of refractive index, cost, and chemical stability. More specifically, the solid material is preferably composed mainly of silicon dioxide. The phrase "the solid material is composed mainly of silicon dioxide", as used herein, means that the silicon dioxide content of the solid material is 50% or more by mass. The silicon dioxide content of the solid material is typically 90% or more by mass.

Specific examples of silicon dioxide particles include a Snowtex series manufactured by Nissan Chemical Industries, Ltd., organosilica sol, a Thrulya series manufactured by JGC Catalysts and Chemicals Ltd., and an Aerosil series manufactured by Evonik Industries AG. and sold by Nippon Aerosil Co., Ltd.

A composite material C composed of a material A with a refractive index $n_a$ and a material B with a refractive index $n_b$ typically has a refractive index $n_c$ approximately represented by the formula (1):

Formula (1)

$$n_c = [n_a \times v_a/100] + [n_b \times v_b/100] \quad (1)$$

wherein $v_a$ and $v_b$ denote the volume fractions of the material A and the material B, respectively, constituting the composite material ($v_a + v_b = 100$).

According to the formula (1), a composite material of a solid material and air, that is, a porous film with a skeleton of the solid material used as the low-refractive-index layer 104 can have a lower refractive index than the original solid material. In such a structure, the solid material skeleton with a lower refractive index or the low-refractive-index layer 104 with higher porosity results in the low-refractive-index layer 104 with a lower refractive index. To increase the porosity of the low-refractive-index layer 104, the low-refractive-index layer 104 may have a porous structure. In this respect, the low-refractive-index layer 104 can be referred to as a porous film.

In the formula (1), when the material A is air and the material B is silicon dioxide, the refractive index $n_a$ of the air is 1.00, the refractive index $n_b$ of the silicon dioxide is 1.46, and the volume fraction $v_b$ of the silicon dioxide is $100 - v_a$. Thus, $v_a$ can be determined as a function of the refractive index $n_a$ of the low-refractive-index layer 104. The $v_a$ refers to porosity.

When the low-refractive-index layer 104 has a space, the low-refractive-index layer preferably has a porosity in the range of 60.0% to 95.0%, more preferably 65.0% to 90.0%.

For example, according to the formula (1), when the low-refractive-index layer 104 with a silicon dioxide (refractive index 1.46) skeleton has a porosity of less than 60.0%, the refractive index may exceed 1.15.

On the other hand, a porosity of more than 95.0% may result in the low-refractive-index layer 104 with an excessively low refractive index of less than 1.05 and low strength due to a small amount of skeleton constituting the low-refractive-index layer 104.

The silicon dioxide preferably has at least one of an organic group and a hydroxy group on its surface. Silicon dioxide with a hydroxy group on its surface has high hydrophilicity. Thus, the low-refractive-index layer 104 with a skeleton of such silicon dioxide particles can have high hydrophilicity.

For example, the surface of silicon dioxide can be modified with a silane coupling agent to impart functionality to the low-refractive-index layer 104. For silicon dioxide with a hydroxy group on its surface, a dehydration condensation reaction between the hydroxy group and a hydrolysate of a silane coupling agent can be utilized.

Examples of the organic group include alkyl groups having 1 to 4 carbon atoms, such as a methyl group, an ethyl group, a propyl group, and a butyl group; hydrocarbon groups with a polymerizable moiety, such as a vinyl group, an acrylic group, and a methacrylic group; and aromatic hydrocarbon groups, such as a phenyl group.

Silicon dioxide with an organic group on its surface can impart various functions, such as water repellency, oil repellency, biocompatibility, electron-transport characteristics, and polymerizability, to the low-refractive-index layer 104.

All of the functional groups on the surface of silicon dioxide are not necessarily substituted with an organic group, and an organic group and a hydroxy group may be present in any ratio.

[Hollow Particles]

The low-refractive-index layer 104 containing hollow particles is further described. However, the present disclosure is not limited thereto. The hollow particles have an outer shell formed of a solid material and have a cavity (space) inside the outer shell.

The low-refractive-index layer 104 preferably contains a plurality of hollow particles. The low-refractive-index layer 104 containing a plurality of hollow particles may contain solid particles or a binder in addition to the hollow particles.

FIG. 1 shows an example of the structure of the low-refractive-index layer 104 containing hollow particles as primary particles composed of a solid material.

The low-refractive-index layer 104 contains a plurality of hollow particles 301 and a space 302 between the hollow particles 301. The hollow particles also include a space 304. In FIG. 1, the reference numeral 303 denotes the outer shell, and the reference numeral 305 denotes a base material.

The porosity X (%), which is the ratio of the total volume of the spaces in the hollow particles to the unit volume of the low-refractive-index layer 104, and the porosity Y (%), which is the ratio of the total volume of the space between the hollow particles to the unit volume of the low-refractive-index layer 104, preferably satisfy the relationship of X<Y. (X+Y) represents the porosity of the low-refractive-index layer 104.

The refractive index n of the low-refractive-index layer 104 is represented by the following formula (2):

Formula (2)

$$n=[n_a \times (X+Y)/100]+[n_s \times (100-X-Y)/100] \quad (2)$$

wherein $n_a$ denotes the refractive index of air ($n_a=1$), and $n_s$ denotes the refractive index of the outer shell of the hollow particles ($n_s>1$). According to the formula (2), n decreases with increasing X+Y or decreasing $n_s$.

The refractive index n of the low-refractive-index layer 104 is also represented by the following formula (3):

Formula (3)

$$n=[n_a \times Y/100]+[n_p \times (100-Y)/100] \quad (3)$$

wherein $n_p$ denotes the refractive index of one hollow particle ($n_p>1$). The refractive index $n_p$ is an apparent refractive index calculated from the ratio of the volume and refractive index of the outer shell to the volume and refractive index of the space in one hollow particle. Thus, if $n_a=1$, $n_b=n_s$, $v_a$ denotes the volume of the space of the hollow particle, and $v_b$ denotes the volume of the outer shell in the formula (1), then $n_c=n_p$. According to the formula (3), n decreases with increasing Y or decreasing $n_p$.

X and Y can also be estimated by measuring the refractive index n of the low-refractive-index layer 104 by optical measurement and substituting known $n_a$, $n_s$ and $n_p$ into the formulae (2) and (3).

A dense arrangement of hollow particles decreases the volume fraction of the space between the hollow particles and increases the volume fraction of the outer shell formed of a component with a higher refractive index than air, thus increasing the refractive index of the low-refractive-index layer 104. By contrast, a sparse arrangement of hollow particles increases the volume fraction of the space between the hollow particles and decreases the volume fraction of the outer shell, thus decreasing the refractive index of the low-refractive-index layer 104. Thus, to further decrease the refractive index of the low-refractive-index layer 104, Y/X is preferably increased. More specifically, the relationship of Y/X>1, that is, X<Y is preferably satisfied.

X and Y preferably satisfy the relationship of X<(100−X−Y)<Y.

The low-refractive-index layer 104 may contain particles composed of a solid material and a binder that binds the particles together for reinforcement. When a binder is used, the solid in the low-refractive-index layer 104 is the outer shell of the hollow particles and the binder, and the volume fraction of the solid relative to the unit volume of the low-refractive-index layer 104 is represented by (100−X−Y) (%).

Satisfying the relationship of X<(100−X−Y) further improves the strength of the low-refractive-index layer 104. Satisfying the relationship of (100−X−Y)<Y further decreases the refractive index of the low-refractive-index layer 104.

The total (X+Y) of X and Y preferably ranges from 60.0% to 95.0%, more preferably 65.0% to 90.0%. (X+Y) in these ranges makes it easy to adjust the strength of the low-refractive-index layer 104 and the refractive index of the low-refractive-index layer 104 in a desired range.

In the low-refractive-index layer 104, X preferably ranges from 8.0% to 32.0%, more preferably 10.0% to 28.0%, still more preferably 12.0% to 24.0%.

On the other hand, Y preferably ranges from 30.0% to 80.0%, more preferably 35.0% to 75.0%, still more preferably 40.0% to 70.0%.

X and Y in these ranges make it easy to adjust the strength of the low-refractive-index layer 104 and the refractive index of the low-refractive-index layer 104 in a desired range.

Although the hollow particles are substantially spherical in the example illustrated in FIG. 1, the hollow particles may have any shape. The hollow particles have the outer shell 303 and the space 304 surrounded by the outer shell and formed inside the hollow particles. In this case, the hollow particles can be considered to be core-shell particles containing air as the core.

The refractive index $n_p$ of one hollow particle is represented by the formula (4):

Formula (4)

$$n_p=[n_s \times (100-V_a)/100]+[n_a \times V_a/100] \quad (4)$$

wherein $V_a$ denotes the volume fraction of the internal space relative to the total volume of the hollow particle. Thus, the refractive index $n_p$ of one hollow particle is determined by the refractive index $n_s$ of the outer shell material and the porosity $V_a$ of the hollow particle.

One hollow particle preferably has a porosity $V_a$ in the range of 30.0% to 70.0%, more preferably 35.0% to 65.0%.

A porosity $V_a$ in these ranges can result in the low-refractive-index layer 104 with an easily lowered refractive index, the hollow particles with the outer shell of constant strength, and the low-refractive-index layer 104 of constant strength.

Like the refractive index of the solid material, the refractive index $n_s$ of the outer shell of the hollow particles is preferably 1.10 or more, 1.20 or more, 1.25 or more, 1.30 or more, or 1.35 or more, and preferably 1.65 or less or 1.60 or less. These ranges can be freely combined. The refractive index $n_s$ of the outer shell of the hollow particles more preferably ranges from 1.35 to 1.60.

A refractive index $n_s$ of the outer shell of the hollow particles in these ranges can result in the ease of production of the low-refractive-index layer 104, the hollow particles with high strength, the low-refractive-index layer 104 with high strength, and the low-refractive-index layer 104 with a low refractive index.

The outer shell of the hollow particles may be formed of the same material as the solid material.

The outer shell of the hollow particles may have micropores. The micropores in the outer shell can further decrease the refractive index of the outer shell.

The primary particles of the hollow particles preferably have a number-average particle size in the range of 1 to 200 nm, more preferably 5 to 100 nm, still more preferably 10 to 100 nm, particularly preferably 20 to 100 nm.

A number-average particle size in these ranges can result in the ease of production of the hollow particles, easily reduced light scattering, and the low-refractive-index layer 104 with further improved transmissivity.

[Fumed Silica Particles and Chain Silica Particles]

The low-refractive-index layer 104 preferably contains at least one type of particles selected from the group consisting of secondary particles in which primary particles composed of a solid material form a three-dimensional structure, chain secondary particles in which primary particles composed of a solid material are linked in a chain, and branched chain secondary particles in which primary particles composed of a solid material are linked in a branched chain. When particles composed of a solid material form an aggregate, the aggregate is also included in the secondary particles in which primary particles composed of a solid material form a three-dimensional structure.

The secondary particles in which primary particles composed of a solid material form a three-dimensional structure, the chain secondary particles in which primary particles composed of a solid material are linked in a chain, and the branched chain secondary particles in which primary particles composed of a solid material are linked in a branched chain decrease the volume fraction of the solid material in the low-refractive-index layer 104. This can increase the volume fraction of the space. This can therefore decrease the refractive index of the low-refractive-index layer 104.

The primary particles composed of a solid material preferably have a number-average particle size in the range of 1 to 200 nm, more preferably 5 to 100 nm. The primary particles composed of a solid material more preferably have a number-average particle size in the range of 10 to 100 nm, particularly preferably 20 to 100 nm.

When the primary particles have a number-average particle size in these ranges, it is possible to appropriately control the aggregation of particles and improve dispersibility in a coating liquid. Furthermore, it is possible to potentially prevent the primary particles from becoming light scatterers in the wavelength range of 400 to 700 nm and further improve the transmissivity of the low-refractive-index layer 104.

Fumed silica particles are described below as an example of the secondary particles in which primary particles composed of a solid material form a three-dimensional structure. However, the present disclosure is not limited thereto.

Fumed silica particles can be produced by high-temperature hydrolysis of silicon tetrachloride in oxygen and hydrogen flame. In fumed silica particles produced by this production method, primary particles of tens of nanometers are fused to form secondary particles with a three-dimensional structure. The secondary particles may aggregate and have a complex higher-order structure.

Due to their characteristic structure, fumed silica particles are very bulky particles with an apparent specific gravity in the range of 0.01 to 0.1 $g/cm^3$. Thus, the low-refractive-index layer 104 containing the fumed silica particles has a high porosity and can significantly decrease the refractive index.

The secondary particles preferably have a number-average particle size in the range of 10 to 1000 nm, more preferably 50 to 500 nm.

When the secondary particles have a number-average particle size in these ranges, for example, primary particles of silicon dioxide form a three-dimensional structure, and the secondary particles do not have a simple structure of aggregated primary particles.

The secondary particles with the above structure make it easy to control the porosity and the refractive index of the low-refractive-index layer 104 in the above ranges. Furthermore, this makes it difficult to form a huge space, which can be a light scatterer in the wavelength range of 400 to 700 nm, between the secondary particles, and makes it easy to control the light transmittance of the low-refractive-index layer 104.

The number-average particle size of the primary particles and the secondary particles can be determined with a transmission electron microscope (TEM) (both are calculated from the arithmetic mean of the maximum diameters). The number-average particle size of the primary particles and the secondary particles can be controlled, for example, by adjusting the conditions for the high-temperature hydrolysis of silicon tetrachloride in oxygen and hydrogen flame, as described above.

<Film-Forming Method>

[Method for Preparing Coating Liquid]

A method for preparing a coating liquid for forming the low-refractive-index layer 104 is described below. Although fumed silica particles in which primary particles of silicon dioxide form a three-dimensional structure are described below, the present disclosure is not limited thereto.

Fumed silica particles are dispersed in a solvent. The solvent in which fumed silica particles are to be dispersed is preferably a solvent with a high affinity for the fumed silica particles. One solvent or a mixture of two or more solvents may be used depending on the type of functional group on the surface of the fumed silica particles.

The solvent is preferably an organic solvent and may be an alcohol solvent, such as methanol, ethanol, propanol, or isopropanol, a glycol solvent, such as ethylene glycol or propylene glycol, an ether solvent, such as dimethyl ether, diethyl ether, ethylene glycol monomethyl ether, ethylene glycol monoethyl ether, propylene glycol monomethyl ether, or propylene glycol monoethyl ether, an acetate solvent, such as ethyl acetate, propyl acetate, propylene glycol monomethyl ether acetate, or propylene glycol monoethyl ether acetate, or a ketone solvent, such as acetone or methyl ethyl ketone.

Although the solvent may be water, water has a high surface tension, causes a large capillary force when dried, and sometimes shrinks the space between the fumed silica particles. This is likely to decrease the porosity of the low-refractive-index layer 104 and can increase the refractive index.

When an alkali metal, particularly CsI, is used as a material of the scintillator 105, water is not appropriate for the solvent due to its strong deliquescence. Particles composed of a solid material may be used alone or in combination of two or more types thereof.

The amount of particles composed of a solid material in the coating liquid is preferably 1.0% or more by mass, more preferably 2.0% or more by mass, still more preferably 3.0% or more by mass, particularly preferably 7.0% or more by mass. The amount of silica particles in the coating liquid is preferably 50.0% or less by mass, more preferably 30.0% or less by mass, still more preferably 20.0% or less by mass. These ranges can be freely combined.

For example, the concentration of the fumed silica particles (solid content) in the coating liquid preferably ranges from 1.0% to 30.0% by mass, more preferably 2.0% to 20.0% by mass.

When the amount of particles composed of a solid material in the coating liquid, for example, the amount (concentration) of fumed silica particles is in the above ranges, the thickness of the low-refractive-index layer 104 is easily adjusted to 500 nm or more. This can also improve the uniform dispersibility of the fumed silica particles in the solvent and makes it easy to adjust the transmissivity of the low-refractive-index layer 104 in the above ranges.

Fumed silica particles are added to the solvent and are dispersed. When a coating liquid in which fumed silica particles are dispersed while maintaining a complex higher-order structure is formed into a film, the fumed silica particles and the space between the fumed silica particles have such a size that visible light is scattered, and therefore the transmissivity of the low-refractive-index layer 104 may decrease. When fumed silica particles are subjected to dispersion treatment, the transparency of the coating liquid increases with the dispersion treatment time.

When a coating liquid containing appropriately dispersed fumed silica particles is formed into a film, the skeleton of the fumed silica particles and the space between the fumed silica particles have such a size that they do not become scatterers of visible light. Thus, the low-refractive-index layer 104 has high transmissivity.

Further dispersion treatment is likely to destroy the bulky higher-order structure of the fumed silica particles into primary particles, may decrease the porosity, and tends to increase the refractive index of the low-refractive-index layer 104.

Furthermore, excessive dispersion treatment causes the so-called overdispersion, is likely to reaggregate the fumed silica particles, and may decrease the transmissivity of the low-refractive-index layer 104 after film formation.

Thus, an appropriate dispersion state is preferred. A stirrer, ultrasonic waves, a planetary mixer, a ball mill, a bead mill, a homogenizer, or the like can be used for the dispersion treatment.

Although hollow particles with a silicon dioxide outer shell are used as a solid material in the following example, the present disclosure is not limited to this example.

A dispersion liquid of hollow particles can be used. The dispersion liquid of hollow particles may be any dispersion liquid of hollow particles that satisfies the porosity of the hollow particles, the refractive index of the outer shell of the hollow particles, the number-average particle size of the primary particles of the hollow particles, and the like.

For example, the Thrulya series manufactured by JGC Catalysts and Chemicals Ltd., which is an isopropanol (hereinafter also referred to as IPA) dispersion liquid of hollow particles with a silicon dioxide outer shell (hereinafter also referred to as hollow silica particles), is preferably used. In addition to commercial products, such as the Thrulya series, hollow silica particles dispersed in a solvent by the same method as the solvent dispersion of the fumed silica particles may be used.

The concentration of hollow particles in a solvent may be in the same range as the concentration of the fumed silica particles (solid content) in the coating liquid.

The surface of hollow silica particles has a hydroxy group and is hydrophilic. Thus, highly hydrophobic solvents are not suitable. More specifically, an organic solvent with an octanol/water partition coefficient log $P_{ow}$ of 2 or less is preferably used. The organic solvent may be an alcohol solvent, such as methanol, ethanol, propanol, or isopropanol, a glycol solvent, such as ethylene glycol or propylene glycol, an ether solvent, such as dimethyl ether, diethyl ether, ethylene glycol monomethyl ether, ethylene glycol monoethyl ether, propylene glycol monomethyl ether, or propylene glycol monoethyl ether, an acetate solvent, such as ethyl acetate, propyl acetate, propylene glycol monomethyl ether acetate, or propylene glycol monoethyl ether acetate, or a ketone solvent, such as acetone or methyl ethyl ketone.

As described above, to decrease the refractive index of the film, it is necessary to increase Y and X+Y. One method is to randomly arrange hollow silica particles.

A method of randomly arranging hollow silica particles is described below. Hollow silica particles can be randomly arranged by forming a loose aggregate of the hollow silica particles in a dispersion liquid.

Aggregates are also included in secondary particles in which primary particles composed of a solid material form a three-dimensional structure.

One method of aggregating hollow silica particles well dispersed in a dispersion liquid may be a method of adding a solvent (hereinafter referred to as an aggregating agent) with a higher log $R_{ow}$ than the dispersion medium. The aggregating method is not limited to this method and is preferably a method by which the aggregation state of hollow silica particles can be controlled.

The surface of hollow silica particles has a hydroxy group and is hydrophilic. Thus, the addition of an aggregating agent with a higher log $P_{ow}$ than the dispersion medium, that is, an aggregating agent that is more hydrophobic than the dispersion medium causes the aggregation of the hollow silica particles.

The log Pow and addition amount of an aggregating agent for aggregating hollow silica particles well dispersed in a dispersion liquid are described below. An excessively small difference in log $P_{ow}$ between the dispersion medium and the aggregating agent causes no aggregation of hollow silica particles. An excessively large difference in log Pow between the dispersion medium and the aggregating agent causes strong aggregation of the hollow silica particles even when a small amount of aggregating agent is added. When hollow silica particles form a large aggregate, the aggregate itself may become a light scatterer.

On the other hand, a large space formed between large aggregates of hollow silica particles also tends to become a light scatterer, may make the low-refractive-index layer 104 cloudy after coating, and may decrease the transmissivity.

Furthermore, significant aggregation tends to decrease the storage stability of the coating liquid. Thus, to form the low-refractive-index layer 104 with a low refractive index and high transmissivity, the aggregation state of the hollow silica particles is preferably controlled by the type and addition amount of the aggregating agent. The refractive index of the low-refractive-index layer 104 may be controlled by utilizing such properties and controlling the aggregation state of the hollow silica particles by the type and addition amount of the aggregating agent.

Furthermore, filling the space between the hollow silica particles with some material may decrease Y and X+Y and increase the refractive index of the low-refractive-index layer 104. Thus, the aggregating agent can preferably be removed and is more preferably volatilized by heating in a downstream process.

The aggregating agent may be, but is not limited to, silicone oil, such as X-22-164 (manufactured by Shin-Etsu Chemical Co., Ltd.).

A method for forming the low-refractive-index layer 104 is described below.

The coating liquid is used to form a film. The film may be formed by a bar coating method, a doctor blade method, a squeegee method, a spray method, a spin coating method, a dip coating method, or a screen printing method. Among them, the spin coating method is preferably used to make the thickness of the low-refractive-index layer 104 uniform. When the film is formed on a large-area sensor panel on which a scintillator is formed, a spray method is preferably used.

Furthermore, to form the low-refractive-index layer 104 with a desired thickness and a flat upper surface, the rotational speed in the spin coating method may be appropriately adjusted.

The film formed by such a method is preferably dried in the temperature range of 20° C. to 100° C.

The film may be further heat-treated. The heat treatment is preferably performed in the temperature range of 100° C. to 200° C., more preferably 120° C. to 180° C.

At a heating temperature to 100° C. or more, for example, the solvent is less likely to remain in the space in the hollow particles. At a heating temperature of 200° C. or less, the performance of a sensor panel corresponding to a light detecting unit 113 is less likely to deteriorate.

When the film contains a binder and a polymerization initiator, it is preferable to include a heat curing or photo-curing step. For heat curing, the solvent may be evaporated simultaneously with the heat curing of the binder in a drying or heating step.

A film formed of fine particles typically maintains its film shape by intermolecular force. Furthermore, hydrophobic interaction acts on a hydrophobic surface of fine particles, and liquid cross-linking acts on a hydrophilic surface of fine particles. These are physical interactions. When a film is heat-treated, for example, hydroxy groups on the surface of fumed silica particles are chemically bonded to each other by a dehydration reaction and can be expected to improve the strength of the film.

When a film containing the particles composed of a solid material is formed to decrease the refractive index, van der Waals forces acting between the particles and liquid cross-linking maintain the structure and the film shape.

A binder for binding particles together may be used in a method for improving the strength of a film with such a structure. From the perspective of improving the strength of the film, the low-refractive-index layer 104 may further contain a binder.

The low-refractive-index layer 104 preferably contains a bound material formed by binding a solid material with a binder. More specifically, the low-refractive-index layer 104 preferably contains a bound material formed by binding particles composed of a solid material with a binder. The binding of a solid material with a binder is a concept including any binding between primary particles composed of the solid material, between secondary particles formed by primary particles composed of the solid material, between the primary particles and the secondary particles, and the like. The binding may be chemical binding, such as an ionic bond or a covalent bond, or mechanical adhesion.

The binder may be a resin, such as acrylic resin, fluororesin, styrene resin, imide resin, urethane resin, or phenolic resin.

The binder may also be an organosilicon compound produced by polymerizing silicone oil with a polymerizable group or by hydrolysis and condensation polymerization of a silicon alkoxide.

In addition to these binders, any clear colorless binder with a low refractive index and capable of binding particles may be used.

An exemplary method for producing a film containing a binder includes the steps of preparing a liquid mixture containing a solid material, a solvent, and the binder, preparing a coating liquid by dispersion treatment of the liquid mixture, and forming a film by applying and drying the coating liquid, and if necessary by heating the coating liquid or by high-energy radiation of the coating liquid.

The binder preferably contains siloxane, more preferably silsesquioxane.

Silsesquioxane is a compound with a T3 unit structure represented by the compositional formula $[R^1(SiO_{1.5})_n]$ ($R^1$ denotes a reactive functional group, for example, at least one selected from the group consisting of polymerizable groups, a hydroxy group, a chlorine atom, alkyl groups with 1 to 6 carbon atoms, and alkoxy groups with 1 to 6 carbon atoms) and is a hybrid material of silicon oxide and an organic substance.

Silsesquioxane (hereinafter sometimes abbreviated to SQ) is a siloxane compound with the main chain backbone composed of Si—O bond and is represented by the composition formula $[R^1(SiO_{1.5})_n]$. $R^1$ preferably denotes at least one polymerizable group selected from the group consisting of an acryloyl group, a methacryloyl group, an oxetanyl group, and an epoxy group.

When silsesquioxane plays a role of binding a large number of particles composed of a solid material together, the film can have much higher strength while retaining high porosity.

Silsesquioxane may have any polymer form, for example, known linear polysiloxane, cage-like polysiloxane, or ladder-like polysiloxane. The silsesquioxane structure is a structure in which each silicon atom is bonded to three oxygen atoms and each oxygen atom is bonded to two silicon atoms (the number of oxygen atoms relative to the number of silicon atoms is 1.5). Linear polysiloxane, cage-like polysiloxane, and ladder-like polysiloxane may be mixed in terms of cost.

The silsesquioxane is preferably a compound with a polymerizable group ($R^1$ in the above formula) in the molecule and curable by radical polymerization or cationic polymerization.

Silsesquioxane curable by radical polymerization may be silsesquioxane with an acryloyl group or a methacryloyl group as R. Silsesquioxane curable by cationic polymerization may be silsesquioxane with an oxetanyl group or an epoxy group as R.

Specific examples include silsesquioxane derivatives SQ series (AC-SQ, MAC-SQ, and OX-SQ) manufactured by Toagosei Co., Ltd.

Silsesquioxane is a liquid with high viscosity and is preferably added to the coating liquid. If necessary, a polymerization initiator may be added.

The binder content of a functional film preferably ranges from 3.0 to 60.0 parts by mass, more preferably 7.0 to 30.0 parts by mass, per 100 parts by mass of particles composed of a solid material. The binder content of a functional film more preferably ranges from 7.0 to 25.0 parts by mass, particularly preferably 10.0 to 25.0 parts by mass, per 100 parts by mass of particles composed of a solid material.

The coating liquid can be applied to a base material, and silsesquioxane can be cured by heating or photoirradiation.

In this operation, a film containing a bound material in which particles composed of a solid material are bound together with silsesquioxane is formed. Silsesquioxane can be cured to increase the strength of the film.

Examples of the polymerization initiator include radical photopolymerization initiators, cationic photopolymerization initiators, thermal radical polymerization initiators, and thermal cationic polymerization initiators. These polymerization initiators may be used alone or in combination.

Examples of the radical photopolymerization initiators include, but are not limited to, optionally substituted 2,4,5-triarylimidazole dimers, such as a 2-(o-chlorophenyl)-4,5-diphenylimidazole dimer, a 2-(o-chlorophenyl)-4,5-di(methoxyphenyl)imidazole dimer, a 2-(o-fluorophenyl)-4,5-diphenylimidazole dimer, and a 2-(o- or p-methoxyphenyl)-4,5-diphenylimidazole dimer; benzophenone derivatives, such as benzophenone, N,N'-tetramethyl-4,4'-diaminobenzophenone (Michler's ketone), N,N'-tetraethyl-4,4'-diaminobenzophenone, 4-methoxy-4'-dimethylaminobenzophenone, 4-chlorobenzophenone, 4,4'-dimethoxybenzophenone, and 4,4'-diaminobenzophenone; a-amino aromatic ketone derivatives, such as 2-benzyl-2-dimethylamino-1-(4-morpholinophenyl)-butanone-1, 2-methyl-1-[4-(methylthio)phenyl]-2-morpholino-propan-1-one; quinones, such as 2-ethylanthraquinone, phenanthrenequinone, 2-t-butylanthraquinone, octamethylanthraquinone, 1,2-benzanthraquinone, 2,3-benzanthraquinone, 2-phenylanthraquinone, 2,3-diphenylanthraquinone, 1-chloroanthraquinone, 2-methylanthraquinone, 1,4-naphthoquinone, 9,10-phenanthraquinone, 2-methyl-1,4-naphthoquinone, and 2,3-dimethylanthraquinone; benzoin ether derivatives, such as benzoin methyl ether, benzoin ethyl ether, and benzoin phenyl ether; benzoin derivatives, such as benzoin, methylbenzoin, ethylbenzoin, and propylbenzoin; benzyl derivatives, such as benzyl dimethyl ketal; acridine derivatives, such as 9-phenylacridine and 1,7-bis(9,9'-acridinyl)heptane; N-phenylglycine derivatives, such as N-phenylglycine; acetophenone derivatives, such as acetophenone, 3-methylacetophenone, acetophenone benzil ketal, 1-hydroxycyclohexyl phenyl ketone, and 2,2-dimethoxy-2-phenylacetophenone; thioxanthone derivatives, such as thioxanthone, diethylthioxanthone, 2-isopropylthioxanthone, and 2-chlorothioxanthone; acylphosphine oxide derivatives, such as 2,4,6-trimethylbenzoyldiphenylphosphine oxide, bis(2,4,6-trimethylbenzoyl)phenylphosphine oxide, and bis(2,6-dimethoxybenzoyl)-2,4,4-trimethylpentylphosphine oxide; oxime ester derivatives, such as 1,2-octanedione,1-[4-(phenylthio)-,2-(O-benzoyloxime)] and ethanone,1-[9-ethyl-6-(2-methylbenzoyl)-9H-carbazol-3-yl]-,1-(O-acetyloxime); xanthone, fluorenone, benzaldehyde, fluorene, anthraquinone, triphenylamine, carbazole, 1-(4-isopropylphenyl)-2-hydroxy-2-methylpropan-1-one, and 2-hydroxy-2-methyl-1-phenylpropan-1-one.

Examples of commercial products of the radical photopolymerization initiators include, but are not limited to, Irgacure 184, 369, 651, 500, 819, 907, 784, 2959, CGI-1700, -1750, and -1850, CG24-61, Darocur 1173, Lucirin TPO, LR8893, and LR8970 (manufactured by BASF, "Darocur" and "Lucirin" are registered trademarks), and Uvecryl P36 (manufactured by UCB).

The cationic photopolymerization initiators are preferably onium salts, aromatic onium salts, arylsulfonium salts, aryliodonium salts, and the like. Specific examples of the anion include tetrafluoroborate ion, hexafluorophosphate ion, hexafluoroantimonate ion, perchlorate ion, trifluoromethanesulfonate ion, and fluorosulfonate ion.

Examples of commercial products of the cationic photopolymerization initiators include CPI-210S (manufactured by San-Apro Ltd.), UVI-6950 (manufactured by Union Carbide Corporation), and Adeka Optomer SP-150 (manufactured by Adeka Corporation).

The polymerization initiator content of the coating liquid preferably ranges from 0.01 to 1.5 parts by mass, more preferably 0.03 to 1.0 part by mass, per 100 parts by mass of the silsesquioxane solid.

A coating liquid may be prepared by mixing particles composed of a solid material, a solvent, a binder, and an optional polymerization initiator. The solvent is preferably an organic solvent. The organic solvent may be, but is not limited to, an alcohol, a carboxylic acid, an aliphatic or alicyclic hydrocarbon, an aromatic hydrocarbon, an ester, a ketone, an ether, or a mixed solvent of two or more thereof.

Examples of the alcohol include methanol, ethanol, 2-propanol, butanol, 2-methoxyethanol, 2-ethoxyethanol, 1-methoxy-2-propanol, 1-ethoxy-2-propanol, 1-propoxy-2-propanol, 4-methyl-2-pentanol, 2-ethylbutanol, 3-methoxy-3-methylbutanol, ethylene glycol, diethylene glycol, and glycerin.

Specific examples of the carboxylic acid include n-butyric acid, α-methylbutyric acid, i-valeric acid, 2-ethylbutyric acid, 2,2-dimethylbutyric acid, 3,3-dimethylbutyric acid, 2,3-dimethylbutyric acid, 3-methylpentanoic acid, 4-methylpentanoic acid, 2-ethylpentanoic acid, 3-ethylpentanoic acid, 2,2-dimethylpentanoic acid, 3,3-dimethylpentanoic acid, 2,3-dimethylpentanoic acid, 2-ethylhexanoic acid, and 3-ethylhexanoic acid.

Specific examples of the aliphatic or alicyclic hydrocarbon include n-hexane, n-octane, cyclohexane, cyclopentane, and cyclooctane.

The aromatic hydrocarbon is preferably toluene, xylene, or ethylbenzene.

Examples of the ester include ethyl formate, ethyl acetate, n-butyl acetate, ethylene glycol monomethyl ether acetate, ethylene glycol monoethyl ether acetate, ethylene glycol monobutyl ether acetate, and γ-butyrolactone.

Examples of the ketone include acetone, methyl ethyl ketone, methyl isobutyl ketone, and cyclohexanone.

Examples of the ether include dimethoxyethane, tetrahydrofuran, dioxane, and diisopropyl ether.

To prepare the coating liquid, among the solvents described above, alcohols are preferably used in terms of solution stability.

The coating liquid can be prepared by adding a predetermined amount of binder and an optional polymerization initiator to a liquid containing particles composed of a solid material dispersed in a solvent. A liquid containing particles dispersed in an organic solvent may be prepared by dispersing a particle powder in the solvent by the same method as the above dispersion treatment (for example, with a ball mill or the like) or may be a commercial dispersion liquid.

When the coating liquid is used to form a film, the coating is performed in an inert gas atmosphere, such as dry air or dry nitrogen. The dry atmosphere preferably has a relative humidity of 30% or less.

Furthermore, a solution coating method for forming a film can be a known coating method, such as a dipping method, a spin coating method, a spray method, a printing method, a flow coating method, or a combination thereof. The film thickness can be controlled by changing the pulling speed in the dipping method or the substrate rotational speed in the spin coating method or by changing the concentration of the coating liquid.

The film may be cured by high-energy radiation, such as photoirradiation or radiation, or by heating. High-energy radiation and heating may be combined for curing.

For curing by high-energy radiation, the high-energy beam may be, but is not limited to, an electron beam, X-rays, ultraviolet radiation, or the like. When the high-energy beam is ultraviolet radiation, the radiation wavelength preferably ranges from 160 to 400 nm, and the output preferably ranges from 0.1 to 2000 mW/cm$^2$. From the perspective of preventing the oxidation of silsesquioxane, the curing atmosphere is preferably an inert atmosphere, such as nitrogen. Curing by heating may be performed in the temperature range of 50° C. to 250° C., preferably 80° C. to 200° C., for 1 to 20 minutes.

<Method for Evaluating Film Porosity and Refractive Index>

The porosity X (%) and the porosity Y (%) of the film can be calculated as described below.

First, a film formed on a base material is coated with a carbon film using a Model 681 ion beam coater IBC (manufactured by Gatan, Inc.) and is then subjected to ion beam slicing (30 kV-0.1 nA) in a focused ion beam processing apparatus (FIB-SEM, manufactured by FEI Company, Nova 600). An SEM image is then acquired with a scanning electron microscope (hereinafter referred to as an SEM) at an accelerating voltage of 2 kV.

The observation magnification of the SEM image is such that the entire film can be observed at least in the thickness direction and, for example, the shape of each hollow particle can be discriminated. More specifically, the observation magnification is approximately 50,000 to 200,000.

The unit volume of the film is 1000 nm×1000 nm×100 nm (in the thickness direction). To calculate the porosity in the cross-sectional SEM image, hollow particles and the space between the hollow particles are distinguished by binarization of a gray scale image, and the area of each region is calculated. Image processing is performed using image analysis software Image J (NIH Image, available from https://imagej.nih.gov/ij/).

More specifically, the porosity X (%) is calculated by multiplying the area A (%) of the hollow particles by the volume fraction $V_a$ of the internal space relative to the total volume of the hollow particles: $X=A \times V_a$. The porosity Y (%) is Y=100−A.

The refractive index n of the low-refractive-index layer 104 can be calculated using the formula (2) from X and Y thus calculated.

<Thickness of Film>

The low-refractive-index layer 104 may have a thickness in the range of 100 nm to 3.5 μm or 150 nm to 3 μm, for example. The low-refractive-index layer 104 preferably has a thickness in the range of 300 nm to 2 μm. The lower limit of the preferred thickness is determined from the fact that it is preferably equal to or larger than the emission wavelength of a scintillator to sufficiently increase the total reflection efficiency. To use a scintillator that emits light in the visible light region, the low-refractive-index layer preferably has a thickness of 300 nm or more. The low-refractive-index layer with a thickness of 2 μm or less is less likely to crack and has sufficient strength. The thickness of the low-refractive-index layer 104 can be determined from a cross-sectional SEM image, as described in Method for Evaluating Film Porosity and Refractive Index.

[Radiation Detector]

As illustrated in FIG. 2, the scintillator unit 205 and a detecting unit 206 for detecting light from the scintillator unit 205 can constitute a radiation detector 207. The detecting unit 206 may be a silicon photomultiplier array (SiPMA), a complementary metal-oxide semiconductor sensor (CMOS), a flat-panel detector (FPD), or the like.

The detecting unit 206 is preferably in contact with the scintillators 201. Thus, the detecting unit 206 can efficiently detect the light generated by the scintillators 201. The detecting unit 206 is preferably paired with each of the scintillators 201. Thus, the detecting unit 206 can individually detect the light generated by each of the scintillators 201.

A light extraction surface 208 in FIG. 2 is a surface of the scintillator unit 205 from which light generated by the scintillators 201 is emitted. In FIG. 2, the reflective layer 204 and the low-refractive-index layer 104 are located approximately perpendicular to the light extraction surface 208. Thus, a plurality of scintillators and a plurality of detecting units paired with the scintillators are located via the reflective layer 204 and the low-refractive-index layer 104. Thus, light generated by a scintillator is detected by the paired detecting unit but is difficult to detect by unpaired detecting units. Crosstalk can therefore be further reduced.

(Method for Measuring Reflectance)

Reflectance includes absolute reflectance and relative reflectance. Absolute reflectance is the intensity ratio of reflected light to light with a certain wavelength incident on a sample. The incident angle is the angle between incident light and a normal line to a reflecting surface of a sample. The reflection angle is the angle between reflected light and the normal line to the reflecting surface. In the measurement of absolute reflectance, the intensity ratio is measured when the incident angle is equal to the reflection angle.

The relative reflectance is based on the absolute reflectance of a sample. For example, the relative reflectance of two samples is the ratio of the absolute reflectance of one sample to the absolute reflectance of the other sample.

EXEMPLARY EMBODIMENTS

Although a scintillator unit according to the present disclosure is described in detail in the following exemplary embodiments, the present disclosure is not limited to these exemplary embodiments.

Exemplary Embodiment 1

Figure 3:
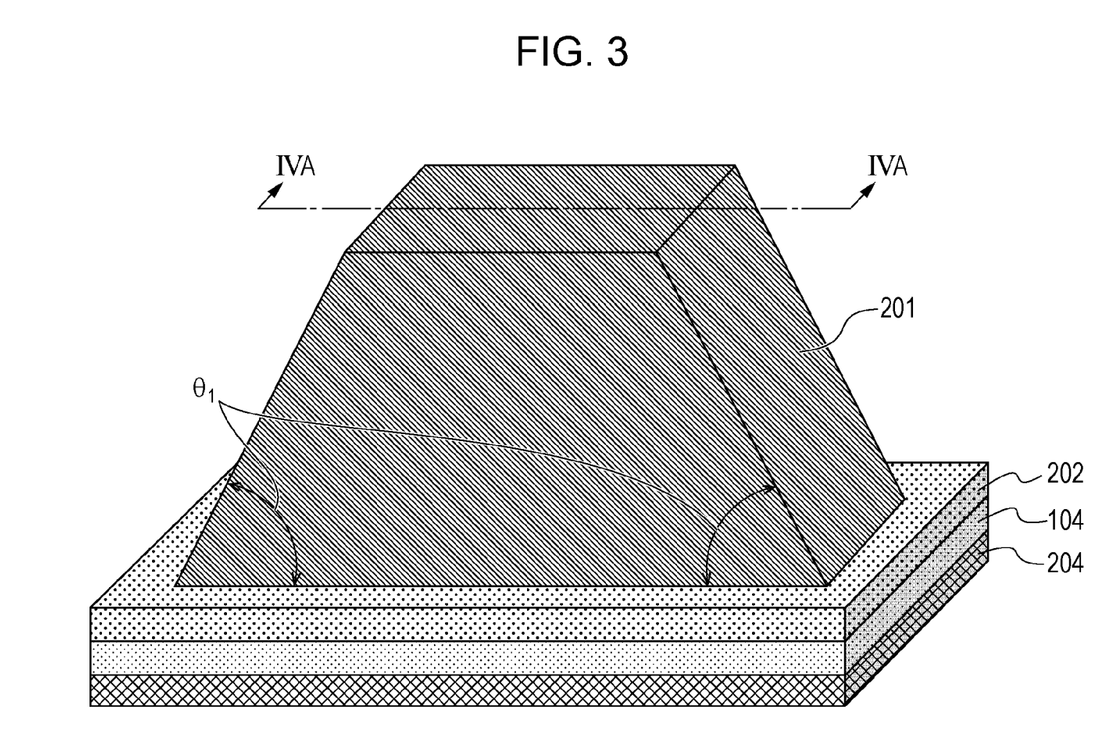
FIG. 3 is a schematic bird's-eye view of a reflectance measurement sample according to an embodiment of the present disclosure.

The improvement in reflectance by a low-refractive-index layer of a scintillator unit according to the present exemplary embodiment was evaluated as described below. FIG. 3 is a schematic bird's-eye view of a reflectance measurement sample according to the present disclosure. As illustrated in FIG. 3, the scintillator was processed such that $\theta_1$ was 40 degrees. The adhesive layer 202, the low-refractive-index layer 104, and the reflective layer 204 were placed on the processed scintillator in this order.

The low-refractive-index layer was formed using hollow silica particles. A coating liquid for film formation was prepared using Thrulya 4110 (dispersion medium: IPA, silica solid content: 20.5% by mass, number-average particle size of one hollow particle: 60 nm, porosity of one hollow particle: 45%, refractive index of one hollow particle: 1.25) manufactured by JGC Catalysts and Chemicals Ltd. The silica solid content of the coating liquid was adjusted to 6.0% by mass. The coating liquid was applied to the reflective layer by a spin coating method at a rotational speed of 1000 rpm for 10 seconds to form the low-refractive-index layer.

The low-refractive-index layer was subjected to ion beam slicing (30 kV-0.1 nA) in the focused ion beam processing apparatus (FIB-SEM, manufactured by FEI Company, Nova 600). An SEM image was then acquired with a scanning electron microscope (hereinafter referred to as an SEM) at an accelerating voltage of 2 kV. The low-refractive-index layer was closely bonded to the reflective layer and had a thickness of 0.5 µm. For the cross-sectional SEM image of the low-refractive-index layer, hollow particles and the space between the hollow particles were distinguished by binarization of a gray scale image, and the area of each region was calculated. The porosity of the low-refractive-index layer was calculated to be 67% in consideration of the calculated area of the hollow particles and the volume fraction of the internal space relative to the total volume of the hollow particles. The refractive index of the low-refractive-index layer was calculated to be 1.15 using the formula (2) wherein ns was 1.46.

The reflective layer on which the low-refractive-index layer was formed was bonded with an epoxy optical adhesive agent (refractive index 1.43) to a scintillator (LSO). The amount of the adhesive agent and the pressing pressure were adjusted such that the adhesive layer had a thickness of 2 µm. The reflective layer was used as a dielectric multilayer film.

The absolute reflectance and relative reflectance were measured with VR670 and ARMN-735 manufactured by JASCO Corporation, as described below.

Figure 4A:
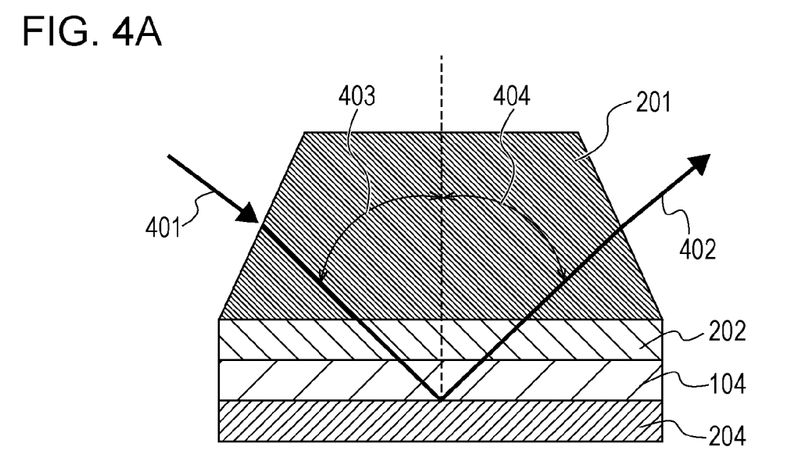
FIG. 4A is a schematic cross-sectional view of a reflectance measurement sample according to an exemplary embodiment of the present disclosure and is a schematic cross-sectional view of Exemplary Embodiment 1.

FIG. 4A illustrates a cross section taken along the line IVA-IVA of FIG. 3. In FIG. 4A, incident light 401 was incident on the reflective layer 204, and the intensity of reflected light 402 reflected by the reflective layer 204 was measured. It was assumed that the reflection angle 404 of the reflected light 402 was the same as the incident angle 403. The incident angle in the following measurement results is the incident angle 403.

Figure 4B:
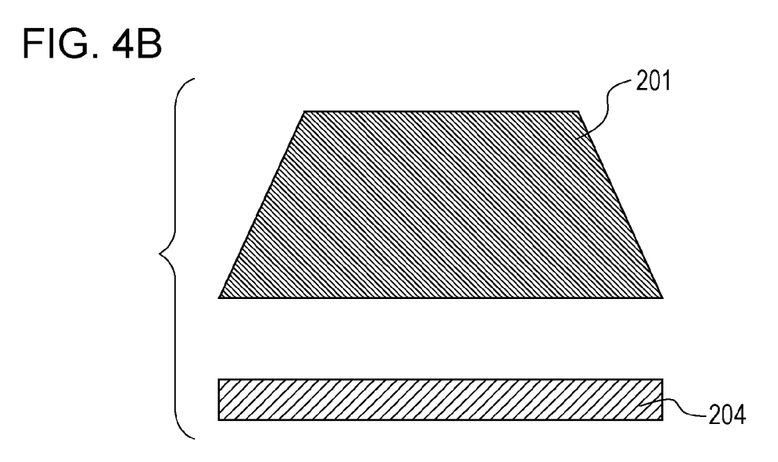
FIG. 4B is a schematic cross-sectional view of a reflectance measurement sample according to an exemplary embodiment of the present disclosure and is a schematic cross-sectional view of a scintillator/air layer/reflective layer.
Figure 5A:
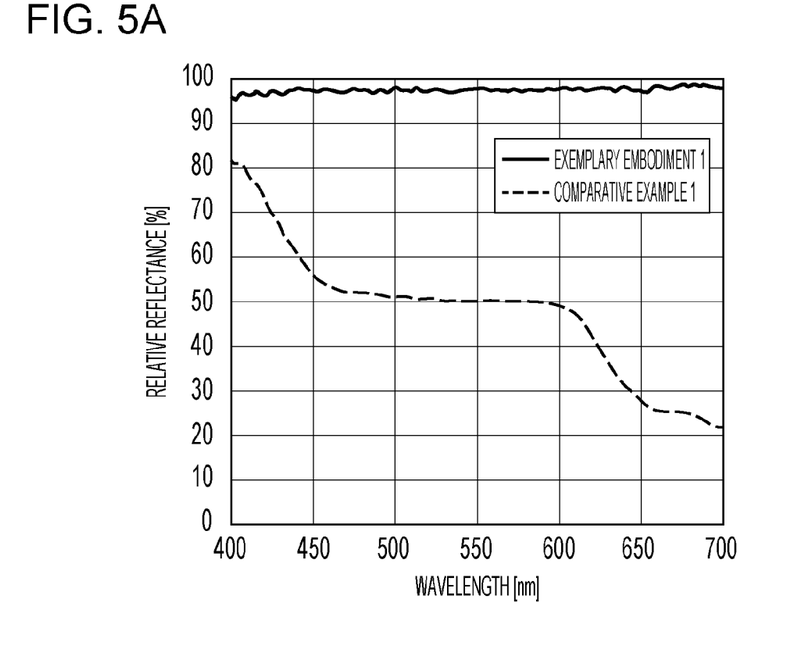
FIG. 5A is an example of a measurement result of a reflectance spectrum in the description of an exemplary embodiment of the present disclosure and is a measurement result of reflectance spectra of Exemplary Embodiment 1 and Comparative Example 1 at an incident angle of 70 degrees.
Figure 5B:
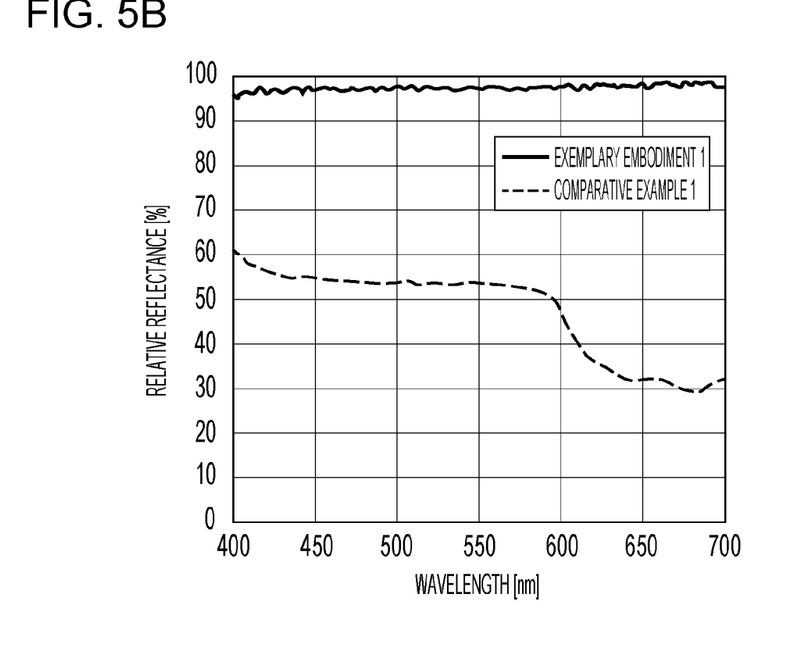
FIG. 5B is an example of a measurement result of a reflectance spectrum in the description of an exemplary embodiment of the present disclosure and is a measurement result of reflectance spectra of Exemplary Embodiment 1 and Comparative Example 1 at an incident angle of 74 degrees.

In the following measurement results, relative reflectance is used. As illustrated in FIG. 4B, a spacer (not shown) was inserted between the reflective layer and the scintillator to form an air layer, and the absolute reflectance of this structure was used as a reference for the relative reflectance. The absolute reflectance measured under each condition was divided by the absolute reflectance of FIG. 4B to calculate the relative reflectance. FIGS. 5A and 5B are examples of measurement results of measured relative reflectance spectra.

Comparative Example 1

Figure 4C:
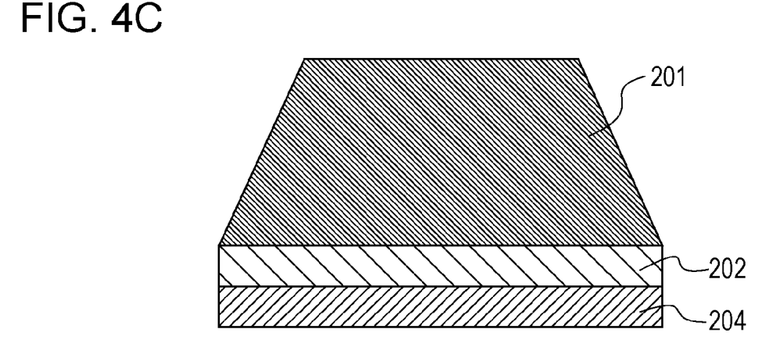
FIG. 4C is a schematic cross-sectional view of a reflectance measurement sample according to an exemplary embodiment of the present disclosure and is a schematic cross-sectional view of Comparative Example 1.

A sample was prepared in the same manner as in Exemplary Embodiment 1 except that the low-refractive-index layer was not used. Thus, as illustrated in FIG. 4C, the scintillator 201, the adhesive layer 202, and the reflective layer 204 were stacked to prepare a sample. The relative reflectance was measured in the same manner as in Exemplary Embodiment 1. FIGS. 5A and 5B show measured relative reflectance spectra.

The relative reflectance spectra of FIGS. 5A and 5B show that Exemplary Embodiment 1 has higher reflectance than Comparative Example 1 at all wavelengths. Thus, it can be understood that light is easily reflected by arranging the adhesive layer and the low-refractive-index layer in this order on the scintillator between the scintillator and the reflective layer.

Furthermore, FIGS. 5A and 5B show relative reflection spectra at incident angles of 70 and 74 degrees, respectively. A comparison between FIGS. 5A and 5B shows that the difference in relative reflectance between Exemplary Embodiment 1 and Comparative Example 1 increases with the incident angle. As illustrated in FIG. 2, when the light extraction surface 208 is approximately perpendicular to the reflective layer 204, Exemplary Embodiment 1 has higher relative reflectance than Comparative Example 1. Thus, it can be understood that light is easily reflected by arranging the adhesive layer and the low-refractive-index layer in this order on the scintillator between the scintillator and the reflective layer.

As described above, the present disclosure can provide a radiation detector including a scintillator unit that can reduce crosstalk when the scintillator unit includes a plurality of scintillators.

The present disclosure can provide a scintillator unit that can reduce crosstalk when the scintillator unit includes a plurality of scintillators and can also provide a radiation detector.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

The invention claimed is:

1. A scintillator unit comprising a reflective layer between a plurality of scintillators and the plurality of scintillators,
   wherein an adhesive layer and a low-refractive-index layer with a lower refractive index than the adhesive layer are located in this order on the scintillators between the scintillators and the reflective layer.

2. The scintillator unit according to claim 1, wherein the scintillator unit includes the scintillators, the adhesive layer, the low-refractive-index layer, the reflective layer, the low-refractive-index layer, the adhesive layer, and the scintillators in this order.

3. The scintillator unit according to claim 1, wherein the reflective layer includes a dielectric multilayer film.

4. The scintillator unit according to claim 1, wherein the low-refractive-index layer is located approximately perpendicular to a light extraction surface of the scintillator unit.

5. The scintillator unit according to claim 1, wherein the adhesive layer contains at least one of an epoxy resin, an acrylic resin, and a vinyl resin.

6. The scintillator unit according to claim 1, wherein the adhesive layer has a thickness in the range of 2 to 5 µm.

7. The scintillator unit according to claim 1, wherein the adhesive layer has a refractive index of more than 1.30 and less than 1.70.

8. The scintillator unit according to claim 1, wherein the low-refractive-index layer contains silicon oxide.

9. The scintillator unit according to claim 1, wherein the low-refractive-index layer has a refractive index in the range of 1.10 to 1.20.

10. The scintillator unit according to claim 1, wherein the low-refractive-index layer has a space, and the low-refractive-index layer has a porosity in the range of 60.0% to 95.0%.

11. The scintillator unit according to claim 1, wherein the low-refractive-index layer has a thickness in the range of 300 nm to 2 µm.

12. The scintillator unit according to claim 1, wherein the low-refractive-index layer contains hollow particles.

13. The scintillator unit according to claim 12, wherein the hollow particles have an outer shell with a refractive index in the range of 1.35 to 1.60.

14. The scintillator unit according to claim 12, wherein the hollow particles are hollow silica particles.

15. The scintillator unit according to claim 1, wherein the low-refractive-index layer contains fumed silica particles.

16. A radiation detector comprising: a scintillator unit including a reflective layer between a plurality of scintillators and the plurality of scintillators; and a detecting unit configured to detect light generated from the scintillators,
wherein the scintillator unit includes an adhesive layer and a low-refractive-index layer with a lower refractive index than the adhesive layer in this order on the scintillators between the scintillators and the reflective layer.

* * * * *